(No Model.)
C. H. BRAMPTON.
DRIVING CHAIN.
No. 449,997. Patented Apr. 7, 1891.
FIG. 1.
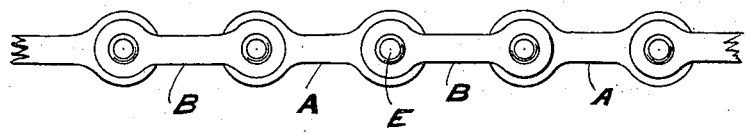
FIG. 2.
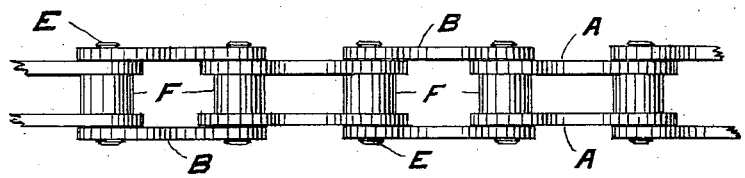
FIG. 3.     FIG. 4.     FIG. 5.
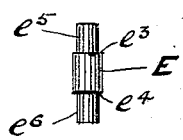 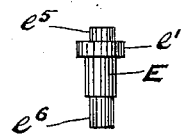 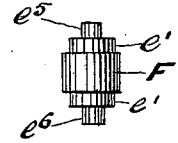
FIG. 6.
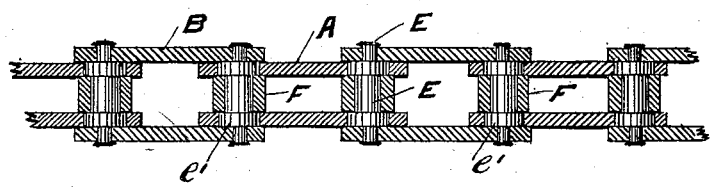
FIG. 7.     FIG. 8.     FIG. 9.
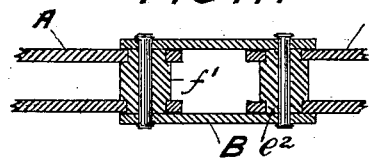  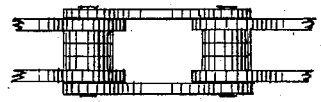
FIG. 10.     FIG. 11.
Witnesses
W Harry Muzzy
G. M. Copenhaver
Inventor
Charles Henry Brampton
By W H Babcock
Atty

UNITED STATES PATENT OFFICE.

CHARLES HENRY BRAMPTON, OF BIRMINGHAM, ENGLAND.

DRIVING-CHAIN.

SPECIFICATION forming part of Letters Patent No. 449,997, dated April 7, 1891.

Application filed November 18, 1890. Serial No. 371,777. (No model.) Patented in England February 26, 1890, No. 3,060.

*To all whom it may concern:*

Be it known that I, CHARLES HENRY BRAMPTON, manufacturer, of the firm of F. W. Brampton & Co., 14 Oliver Street, Birmingham, in the county of Warwick, England, and a subject of the Queen of Great Britain, have invented certain new and useful Improvements in Driving-Chains, (for which I have obtained a patent in Great Britain, dated February 26, 1890, No. 3,060,) of which the following is a specification.

My invention has for its object improvements in driving-chains which are applicable to such purposes as the driving of bicycles, tricycles, and other velocipedes and machinery and is constructed to distribute the wear over a large surface by a particular formation of the parts and construction of the chain. It is as follows: Every other link of my chain has a large hole bored through it, indeed as large as the eye of the link will allow, and the intermediate or outside links have the usual-sized or smaller holes in them to correspond with the size of the pivot or joint pin used. Upon the pivot or joint pin I shrink or otherwise fasten two hardened steel or other metal washers, one at each end, in combination with a central anti-friction roller placed upon the pin between the two hardened washers, so that it will turn and run easily. I then place on each side one of the inner links having the large holes to drop easily with a good but free fit upon the hardened washers when the outer or small-holed coupling-links are placed upon the projecting ends of the pivot-pins and are there riveted or otherwise so thoroughly fastened that the pins cannot turn therein. The bend of the chain therefore takes place in the large links outside the hardened washers, thus producing a much larger wearing-surface than there would otherwise be. The anti-friction rollers of course are loose upon the pins to turn round as the chain works, and they may be solid or bent round.

In order that my invention may be clearly understood and more easily carried into practice, I have appended hereunto a sheet of drawings, upon which I have fully illustrated the nature of my said improvements.

Figure 1 is a side elevation of a piece of my chain in its complete state. Fig. 2 is a front elevation of same. Fig. 3 is an elevation of the center pin. Fig. 4 is an elevation of the center pin having on it the washer at one end. Fig. 5 is an elevation of the center pin having on it the washer at both ends and the intermediate friction-roller. Fig. 6 is a horizontal section of the length of the chain, but showing the pins and washers in elevation. Fig. 7 is a section of a link, showing a modification in the pivot. Fig. 8 is an elevation of the center pivot-piece used in the chain shown by Fig. 7. Fig. 9 is a similar elevation to Fig. 7, showing a further modification. Fig. 10 is an elevation of the inner link A. Fig. 11 is an elevation of the outer link B.

In carrying my invention into effect each of the links A is provided with the enlarged ends $a^2$, through which the hole $a'$ is bored as large as the ends $a^2$ of the links will admit of. The intermediate or outside links B are provided with the usual-sized or smaller holes to correspond with the size of the pivot or joint pin E. Upon the pivot or joint pin E I shrink or otherwise fasten the two hardened steel or other metal washers $e'$, one at each end against the shoulders $e^3$ and $e^4$ of the pin, between which the central anti-friction roller F is mounted to turn or run easily upon the pin E. The inner links A are mounted with their large holes $a'$ upon the hardened washers $e'$, so as to have a good easy fit, the outer or small-holed coupling-links B being placed upon the projecting ends $e^5$ and $e^6$ of the pivot-pins E, and are riveted sufficiently tight against the washers $e'$ to prevent the pins E turning therein. The bend of the chain therefore takes place in the eye $a'$ of the large links A and outside the hardened washers $e'$, thus producing a much larger wearing-surface at the movable joint than there would otherwise be. One of the washers $e'$ may be solid with the pin E, and the anti-friction roller F may be solid and drilled or bent round into the required shape.

In Figs. 7, 8, and 9 the enlarged bearings $e^2$ are formed in one with the center $f'$; or they may be formed separately, the coupling-links A being first placed upon the bearings $e^2$ and the links B placed at each end. The center $f'$, bearings $e^2$, and links B are in this case riveted tightly together by means of the pivot-pin $e^7$, which passes through without a shoulder, thus leaving the links A free to work on the bearings $e^2$. The roller F or center $f'$ may be formed in two, three, or more sections, as seen in Fig. 9.

What I claim then is—

In a driving-chain, the combination of the outer links B and the transverse pins E, which are riveted thereto, and circular enlargements $e'$ formed on them, with the roller F and the inner links A, which have enlarged openings $a'$ formed in them near their ends to receive the enlargements $e'$, which allow said links to turn freely on them as the chain bends, affording ample bearing-surface, substantially as set forth.

In testimony that I claim the foregoing as my own I affix my name in the presence of two witnesses.

CHARLES HENRY BRAMPTON.

Witnesses:
LEWIS WM. GOOLD,
GEORGE PRICE.